Figure 1:
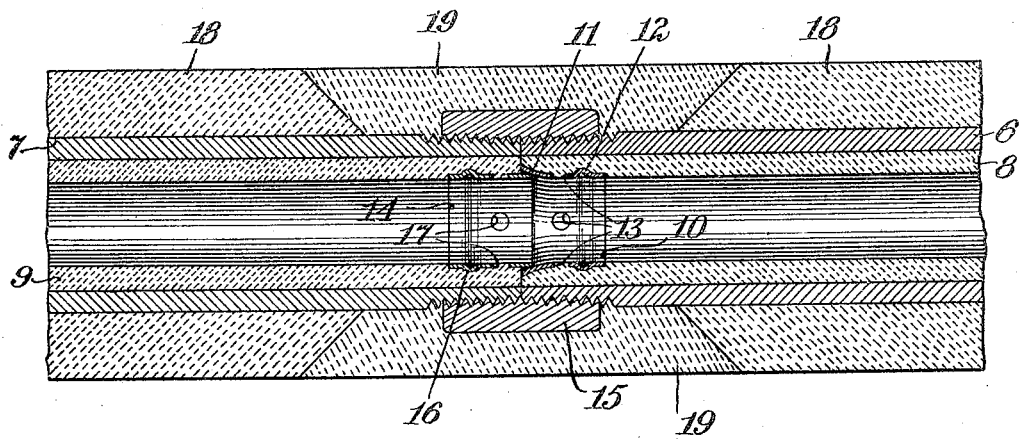

F. H. CANEY.
CEMENT LINED PIPE AND FITTINGS.
APPLICATION FILED MAY 10, 1909.

942,436.

Patented Dec. 7, 1909.
2 SHEETS—SHEET 1.

Witnesses:
Sydney E. Taft
Louis A. Jones

Inventor:
Frank H. Caney
by his attorney Charles N. Gooding

UNITED STATES PATENT OFFICE.

FRANK H. CANEY, OF NEWTON, MASSACHUSETTS.

CEMENT-LINED PIPE AND FITTINGS.

942,436.

Specification of Letters Patent. Patented Dec. 7, 1909.

Application filed May 10, 1909. Serial No. 495,067.

*To all whom it may concern:*

Be it known that I, FRANK H. CANEY, a citizen of the United States, residing at Newton, in the county of Middlesex and State of Massachusetts, have invented new and useful Improvements in Cement-Lined Pipe and Fittings, of which the following is a specification.

This invention relates to an improved metal pipe lined with cement or other non-metallic or insulating material, the invention being also applicable to pipe fittings, such as couplings, tees, unions, and nipples.

The object of the invention is to provide a cement lined metal pipe and fittings therefor which are so constructed that when connected together they will form at their adjacent ends a tight joint. As at present constructed cement lined pipe, or pipe lined with non-metallic or insulating material, is very liable to become chipped off at its adjacent ends, and in any case is very difficult to so construct as to form a tight joint at its adjacent ends when joined together.

The object of the invention is further to provide a metal cement lined pipe and fittings therefor in which the interior bore of the pipe and of the fittings shall be of the same diameter throughout.

The pipe and fittings are further so constructed that, although a metal joint is formed between adjacent ends of the pipes and of the fittings, still there is no connection between this metal joint and the metal forming the body portion of the pipe and of the fittings, so that the pipe when joined together by its couplings, unions, or fittings of any kind is water-tight and can be used as a conductor for electric wires without any danger of short circuiting between the wires and the metal body portion of the pipe.

The invention consists in a metal pipe lined with cement or other non-metallic or insulating material and having a metal sleeve embedded in the cement lining at one end of the pipe and adapted to form a tight joint with another metal sleeve embedded in the cement of the adjacent piece of pipe or fitting.

The invention further consists in the combination and arrangement of parts set forth in the following specification and particularly pointed out in the claims thereof.

Figure 2:
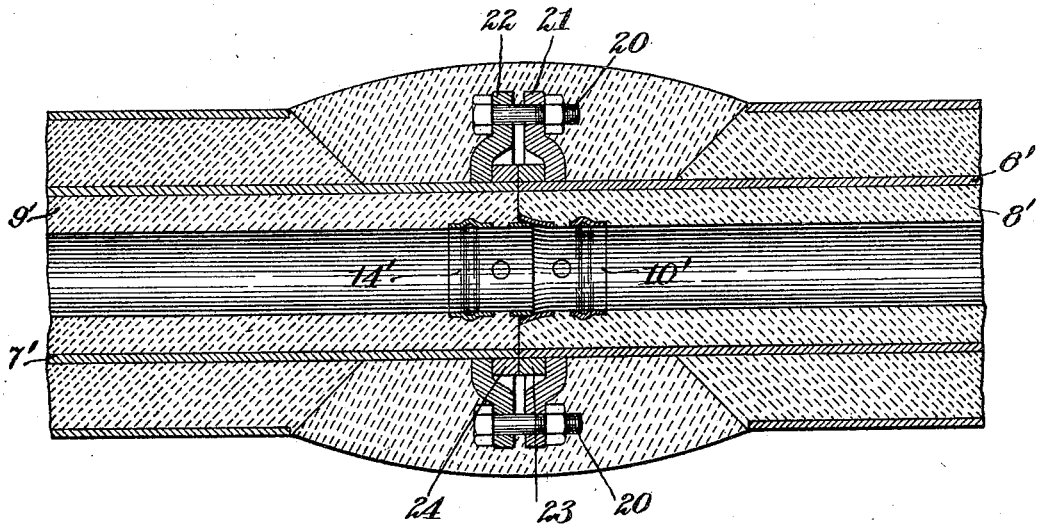
Figure 3:
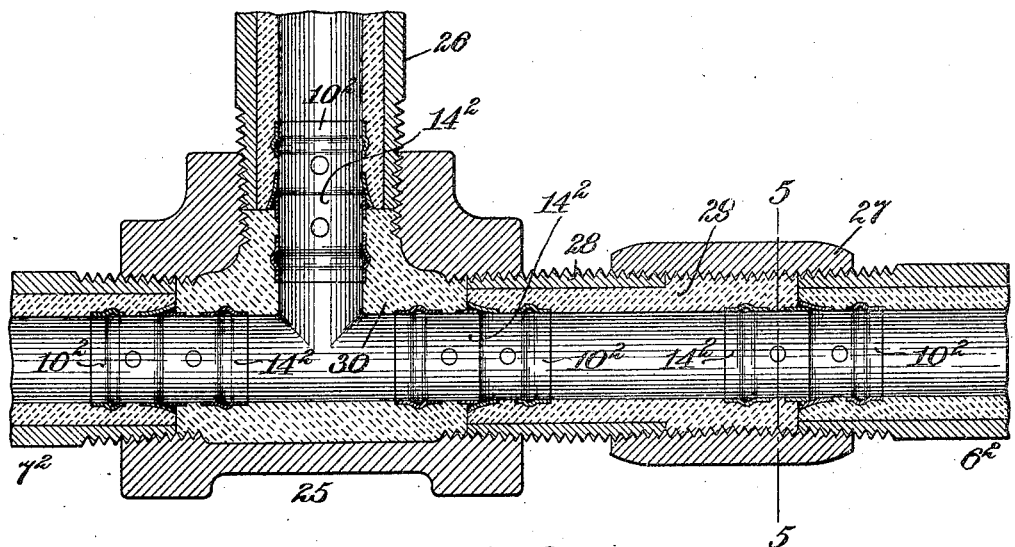
Figure 4:
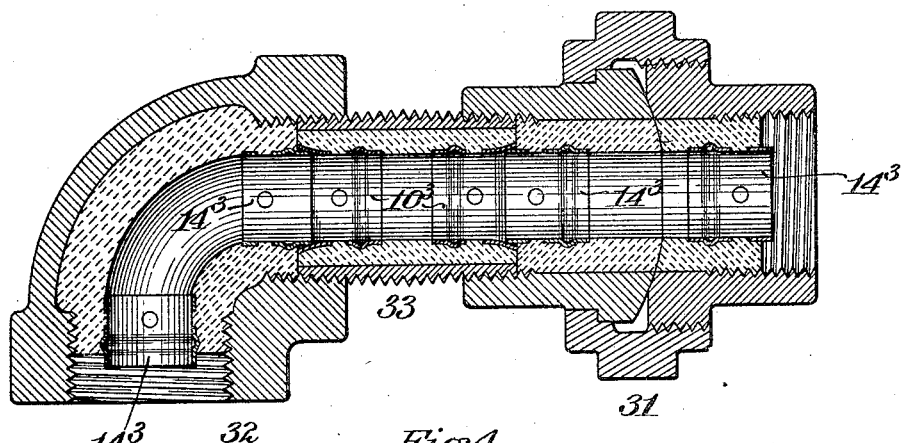
Figure 5:
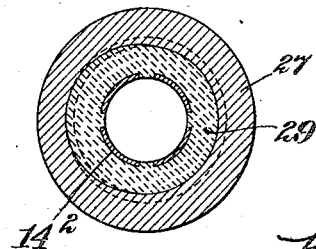

Referring to the drawings: Figure 1 is a central longitudinal section of two sections of cement lined pipe joined together by a coupling and embodying my invention. Fig. 2 is a longitudinal section of two sections of cement lined tube formed of sheet metal and embodying my invention. Fig. 3 is a central longitudinal section of cement lined pipe and fittings, including a coupling, a nipple and a tee, said pipe and fittings being joined together and having a cement lining, together with the particular means for forming a tight joint embodying my invention. Fig. 4 is a central longitudinal section illustrating a union joined to an elbow by a nipple, all of the parts being cement lined and constructed with sleeves formed in accordance with my invention to render the same capable of being joined together in such a manner as to form a tight joint. Fig. 5 is a detail section taken on line 5—5 of Fig. 3.

Like numerals refer to like parts throughout the several views of the drawings.

In the drawings, referring to Fig. 1, 6 and 7 are two sections of metal pipe provided with a cement lining 8 and 9, respectively. In the cement lining 8, at one end of the pipe 6, is embedded a metal sleeve 10. The sleeve 10 has its outer end flared at 11 and flush with the outer end of the cement lining 8 and with the end of the metal pipe 6. Said sleeve is also provided with a projecting portion consisting of an annular rib 12 which projects outwardly from the sleeve and into the cement 8 for the purpose of preventing the sleeve from being pulled out of the cement lining. The sleeve 10 is also provided with holes 13, 13 into which the cement 8 projects and thus prevents the sleeve from rotating within the cement lining. The pipe 7 is also provided with a metal sleeve, 14, which is embedded in the cement 9 and has its outer end projecting beyond the end of the cement 9 and beyond the pipe 7 so as to adapt the same to project into the flared end 11 of the sleeve 10 when the two ends of the pipe are drawn together by the coupling 15, as shown in Fig. 1. The sleeve 14 is also provided with an annular rib 16 and with holes 17 which serve the same purpose as the rib 12 and the holes 13 in the sleeve 10.

When it is desired to join the two sections of pipe 6 and 7, they are drawn together by the coupling 15 and the projecting end of the sleeve 14 enters the flared end 11 of the sleeve 10 and forms a tight joint, the parts being so proportioned that when the adjacent ends of the cement linings 8 and 9 and the adjacent ends of the metal pipes 6 and 7 contact with each other, respectively, the projecting portion of the sleeve 14 will have made contact with the flared end 11 of the sleeve 10, thus making a perfectly tight joint, even if the cement lining 9 or 8 should become chipped or broken at the end thereof.

The pipes, if desired, may have a cement covering 18 and after the same have been joined together in the manner hereinbefore described, the coupling 15 and the joined ends of the pipes 6 and 7 may be covered with cement, shown at 19.

In Fig. 2 I have illustrated the manner in which my improved means for forming a tight joint in a cement lined pipe may be applied to a pipe or tube made of thin sheet metal, and referring now to Fig. 2, it will be understood that the pipes $6'$ and $7'$ are formed of sheet metal lined with cement $8'$ and $9'$, respectively, the pipe $6'$ having a sleeve $10'$ and the pipe $7'$ having a sleeve $14'$, each of these sleeves being embedded, respectively, in the cement linings $8'$ and $9'$ and formed as described in Fig. 1, so that the projecting end of the sleeve $14'$ will project into the flared end of the sleeve $10'$ and form a tight joint when the pipes are drawn together. Said pipes are drawn together by means of bolts 20, 20 which extend through collars 21, 22 on the pipes $6'$ and $7'$, respectively. Said collars bear against flanges 23 and 24 fast to the pipes $6'$ and $7'$. When the nuts upon the bolts 20, 20 are tightened, it will be seen that the adjacent ends of the pipes $8'$ and $9'$ will be drawn toward each other and the sleeve $14'$ will form a tight joint in the flared end of the sleeve $10'$ just prior to the time when the adjacent ends of the pipes $6'$, $7'$, and their cement linings $8'$, $9'$ contact with each other.

Referring now to Fig. 3, it will be seen that $6^2$ and $7^2$ are two sections of pipe broken away to save space in the drawings. 25 is a tee, 26 another section of pipe screwed into said tee, 27 a coupling and 28 a nipple. Each joint between the various pieces of pipes and the fittings in Fig. 3 is rendered water-tight by the pair of sleeves which are embedded in the adjacent ends of the pipe and the fitting, said sleeves being constructed as hereinbefore set forth in relation to Figs. 1 and 2. The pipe $6^2$ has a flared coupling sleeve $10^2$ which makes a tight joint with a sleeve $14^2$ embedded in cement 29, which cement extends through the nipple 28 and partly through the coupling 27. The tee 25 has a cement lining 30. In one opening from the tee a sleeve $14^2$ is embedded and projects into one of the flared sleeves $10^2$ at one end of the nipple 28. Another sleeve $14^2$ projects into a flared sleeve $10^2$ in the pipe $7^2$, and still another sleeve $14^2$ projects into a flared sleeve $10^2$ in the pipe 26. Thus it will be seen that tight joints are made between the ends of the pipes 26, $7^2$ and the nipple 28 in the three openings of the tee 25. It will be noted that in the tee 25 the cement does not project out flush with the metal outside portion of said tee, but stops short thereof, and the nipple and the pipes are screwed into the recess in the metal portion left between the outer end of the cement part and the outer face of the metal portion of the tee, but the sleeves $14^2$, $14^2$ in each case project beyond the outer end of the cement portion, although in the tee said projecting end of the sleeve does not project beyond the outer faces of the tee adjacent to the openings therein.

In Fig. 4 I have illustrated my invention as applied to a union 31, and an elbow 32 joined together by a nipple 33. In each case the tight joint is formed by the metal sleeve $14^3$ projecting into the flared sleeve $10^3$, said sleeves being formed as hereinbefore described, and in both the union and elbow it will be noted that the cement lining does not project out flush with the ends of the union and of the elbow, but leaves a recess between the end of the cement and the outer end of the union or of the elbow into which the fitting, such as a nipple, 33, may be screwed.

It will therefore, be seen that my invention is applicable either to the pipes or to any of their fittings and that the same produces a practical means for joining together cement lined pipe with fittings, in such a manner that the joints between the fittings and pipe, or between sections of the pipe, or between different fittings will be watertight, and also that the metal parts constituting the exterior of the pipe and fittings are separated from the metal sleeves which form the tight joints by a non-conductor, such as cement, or any other desirable pipe lining which is a non-conductor.

In the following claims, the pipe is set forth as a cement lined pipe, but I do not wish to be understood as limiting my invention to a cement lined pipe, as any pipe or fittings which are lined with non-conducting material and have embodied therein the metal sleeves whereby a tight joint is made between two adjacent pieces of pipe or between fittings or between pipe and fittings come within the scope of my invention.

While I have described the sleeves 10 and 14 as made of metal in the foregoing specification, these sleeves may be made of other material than metal, such, for instance, as hard rubber, and in cases where the sleeves are subjected to liquid containing an acid, it is desirable to use hard rubber instead of metal. I, therefore, do not wish to confine my invention to any particular material in the construction of the sleeves corresponding to the sleeves 10 and 14, which, when drawn together, make the tight joint hereinbefore described.

Having thus described my invention, what I claim and desire by Letters Patent to secure is:

1. A metal pipe lined with cement having a metal sleeve embedded in said cement at one end thereof, said metal sleeve being completely separated from said metal pipe by said cement and forming a part of its interior bore.

2. A metal pipe lined with cement having a metal sleeve embedded in said cement at one end thereof, said metal sleeve being completely separated from said metal pipe by said cement and forming a part of its interior bore, said sleeve having a portion thereof projecting outwardly therefrom into said cement lining.

3. A metal pipe lined with cement having a metal sleeve embedded in said cement at one end thereof, said metal sleeve being completely separated from said metal pipe by said cement and forming a part of its interior bore, said sleeve having a hole therein into which said cement projects.

4. A metal pipe lined with cement having a metal sleeve embedded in said cement at one end thereof, said metal sleeve being completely separated from said metal pipe by said cement and forming a part of its interior bore, said sleeve having an annular rib projecting outwardly therefrom into said cement lining.

5. A metal pipe lined with cement having a metal sleeve embedded in said cement at one end thereof, said metal sleeve being completely separated from said metal pipe by said cement and forming a part of its interior bore, said sleeve projecting outwardly beyond one end of said cement lining.

6. A metal pipe lined with cement having a metal sleeve embedded in said cement at one end thereof, said metal sleeve being completely separated from said metal pipe by said cement and forming a part of its interior bore, the outer end of said sleeve being flared outwardly.

7. In combination, two pieces of cement lined metal pipe, each having a sleeve embedded in said cement at one end thereof, said sleeves adapted to bear one against the other, and means to draw said ends of said pipes toward each other, whereby said sleeves are brought into contact one with the other to form a tight joint.

8. In combination, two pieces of cement lined metal pipe, one having a sleeve embedded in its cement and projecting outwardly beyond one end of said cement, the other having a sleeve embedded in its cement at one end thereof, the outer end of said last named sleeve being flared outwardly, the outer ends of said sleeves adapted to bear against each other, and means to draw said ends of said pipes toward each other, whereby said sleeves are brought into contact one with the other to form a tight joint.

9. The herein described means for forming a tight joint between the adjacent ends of cement lined pipe and fittings therefor consisting of a sleeve embedded in one end of said pipe and another sleeve embedded in one end of said fitting, said sleeves adapted to bear against each other to form a tight joint when said fittings and pipe are drawn together.

10. The herein described means for forming a tight joint between the adjacent ends of cement lined pipe and fittings therefor consisting of a sleeve embedded in one end of said pipe and another sleeve embedded in one end of said fitting, one of said sleeves projecting beyond one end of the cement portion in which it is embedded, the other of said sleeves flared to receive said projecting end, whereby, when said pipe and fitting are drawn together, a tight joint is formed.

11. A cement lined pipe in two parts, each of said parts having a sleeve embedded in its cement lining at one end thereof and forming a part of its interior bore, said sleeves adapted to bear one against the other to form a tight joint, and means to draw said pieces of pipe together.

In testimony whereof I have hereunto set my hand in presence of two subscribing witnesses.

FRANK H. CANEY.

Witnesses:
  CHARLES S. GOODING,
  ANNIE J. DAILEY.